United States Patent [19]

Isono et al.

[11] Patent Number: 4,746,064

[45] Date of Patent: May 24, 1988

[54] SNOW GENERATING AND SNOWFALL APPARATUS

[75] Inventors: Kenji Isono; Jutaro Kobayashi, both of Tokyo; Takehiko Gonda, Ageo; Yoshio Sasyo, Funabashi; Nagaichi Suga; Shinichi Katayanagi, both of Tokyo, all of Japan

[73] Assignee: Suga Weathering Technology Foundation, Tokyo, Japan

[21] Appl. No.: 920,194

[22] Filed: Oct. 17, 1986

[51] Int. Cl.$^4$ ............................................. A01G 15/00
[52] U.S. Cl. .................................................. 239/14.2
[58] Field of Search ...................... 239/22, 14.2; 62/74; 261/30, 140.1, 151

[56] References Cited

U.S. PATENT DOCUMENTS

| | | | |
|---|---|---|---|
| 1,104,920 | 7/1914 | Osborne | 62/74 |
| 3,257,815 | 6/1966 | Brocoff et al. | 62/74 X |
| 3,464,625 | 9/1969 | Carlsson | 239/14.2 X |
| 3,733,029 | 5/1973 | Eustis et al. | 239/14.2 |
| 3,761,020 | 9/1973 | Tropeano et al. | 239/2.2 |
| 3,945,567 | 3/1976 | Bambach | 239/14.2 |
| 3,952,944 | 4/1976 | Dupre | 239/2.2 |
| 3,964,682 | 6/1976 | Tropeano et al. | 239/14.2 |
| 4,200,228 | 4/1986 | Woerpel | 239/2.2 |

Primary Examiner—Andres Kashnikow
Assistant Examiner—Kevin Patrick Weldon
Attorney, Agent, or Firm—Wenderoth, Lind & Ponack

[57] ABSTRACT

A snow generating and snowfall apparatus has a snowfall chamber having in a top wall thereof an opening, a vertically extending cooling tower having the bottom mounted on the top wall and surrounding the opening, a air first cooler connected to the tower for cooling the air in the tower, an inner cylinder positioned in the cooling tower and extending in the lengthwise direction thereof and having a bottom end opening connected to the opening in the top wall, a circulating passage connecting the top end of the inner cylinder and a lower end portion thereof to each other, a variable speed blower in an intermediate portion of the circulating passage, a humidifier connected to the lower portion of the inner cylinder for feeding water vapor into the inner cylinder in the vicinity of the lower end thereof, and a snow generating material feeder connected to the inner cylinder in the vicinity of the humidifer for feeding a snow-generating material consisting of ice crystals into the inner cylinder.

4 Claims, 1 Drawing Sheet

U.S. Patent   May 24, 1988   4,746,064
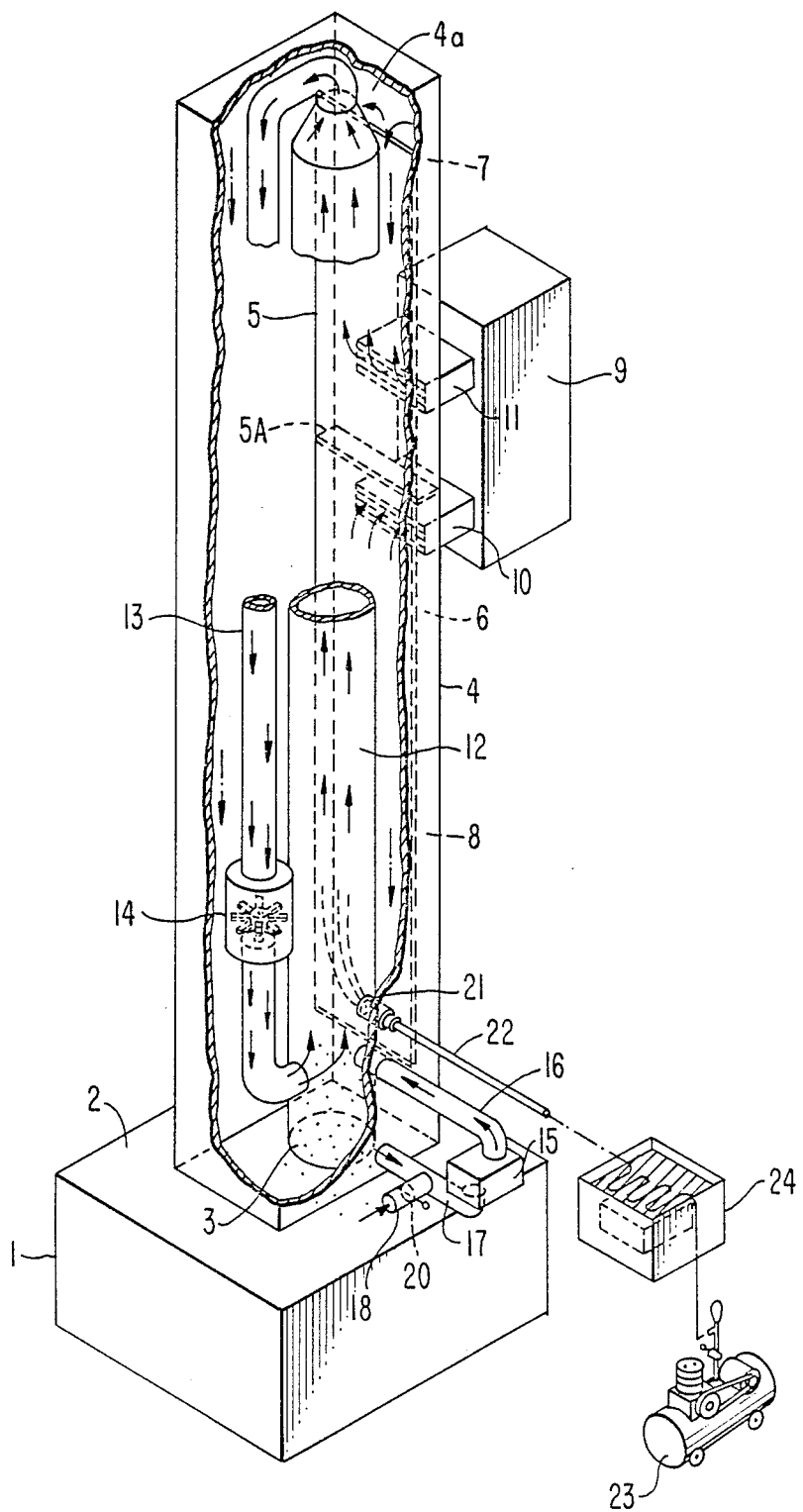

SNOW GENERATING AND SNOWFALL
APPARATUS

BACKGROUND OF THE INVENTION

1. Field of the Invention

This invention relates to a snow generating and snowfall apparatus designed to artificially produce snow substantially the same as natural snow and causing it to fall like natural snow for research and experiments.

2. Description of the Prior Art

In a conventional apparatus called a snow generator, a mist-like aggregation of minute water globules is frozen which produces ice particles which is artificial snow. This artificial snow is quite different from natural snow, which is a special crystallized form of water particles. Artificial snow produced as just described can be used for amusement, such as skiing and the like, and decoration, but it is not a substitute for natural snow and cannot be used for experiments and research which require natural snow.

It is not believed that there has yet been developed an apparatus for artificially and continuously generating frozen water material which has the hexapetalous crystalline structure of natural snow.

SUMMARY OF THE INVENTION

Therefore, it is an object of the present invention to provide an apparatus for artificially and continuously generating artificial snow having the same crystalline structure as natural snow and capable of being used for experiments and research, and which apparatus also causes the generated snow to fall like natural snow.

According to the present invention, a snow generating and snowfall apparatus is provided which includes a cooling tower, and an inner cylinder disposed in the cooling tower extending in the length-wise direction thereof, and air in the space between the inner surface of the cooling tower and outer surface of the inner cylinder is cooled while a low-temperature snow-generating material and vapor are supplied to the interior of the inner cylinder, whereby conditions like those for the generating of natural snow are created artificially for generation of real snow, and this snow is then caused to fall into a snowfall chamber. Thus, research and experiments using snow which is just like natural snow can be made during all seasons.

The above and other objects as well as advantageous features of the invention will become apparent from the following description of the preferred embodiment taken in conjunction with the accompanying drawing.

BRIEF DESCRIPTION OF THE DRAWING

The accompanying drawing is a partially cutaway perspective view of the snow generating and snowfall apparatus according to the present invention.

BRIEF DESCRIPTION OF THE PREFERRED EMBODIMENT

Referring to the drawing, the snow generating and snowfall apparatus according to the invention includes a fallen snow collection chamber 1 provided with suitable equipment (not shown) for carrying out research and experiments. The top wall 2 of this snowfall chamber 1 is provided with an opening 3 which will be described in detail later. A cooling tower 4 is mounted on the top wall 2 of the snowfall chamber 1 with the bottom end thereof surrounding the opening 3 of the snowfall chamber 1. The cooling tower 4 illustrated in the drawing has a rectangular cross-sectional shape. It may also be formed cylindrically or in any other desired shape. In order that the cooling tower 4 function well, it is necessary that the tower be elongated in the vertical direction.

A partition 5 extend along and is spaced from the inner surface of one side wall 4a of the cooling tower 4 and defines with the wall a passage 6 which extends along substantially the whole length of the cooling tower 4. This passage 6 is divided at its intermediate portion by a lateral partition 5A into upper and lower portions 7 and 8. A first air cooler 9 is attached to the outer surface of the side wall 4a along which the passage 6 is provided. A suction port 10 of the first cooler 9 is communicated with the lower passage portion 8, and a discharge port 11 thereof is connected with the upper passage portion 7. Accordingly, when the first air cooler 9 is operated, the cold air therefrom first enters the upper passage portion 7 as shown by arrows, and then flows upward along the passage 6. The cold air then flows over the top edge of the partition 5 and enters the interior of the cooling tower 4 and flows down toward the bottom thereof. The cold air then flows under the bottom edge of the partition 5 and into the lower passage portion 8 and thence to the suction portion 10. The cold air is thus circulated through the interior of the cooling tower 4 to cool the same. In order to increase the cooling effect, it is preferable that the cooling tower 4 be covered with a heat-insulating material.

The cooling tower 4 has therein an inner cylinder 12 which extends in the lengthwise direction thereof. An opening at the bottom end of this inner cylinder 12 is placed over the opening 3 in the top wall 2 of the snowfall chamber 1. A circulating pipe 13 is provided, which is spaced from and extends parallel with the outer surface of the inner cylinder 12. This circulating pipe 13 is joined at the upper end thereof to the upper end of the inner cylinder, and at the lower end thereof to the lower end portion of the inner cylinder. The circulating pipe 13 is provided with variable speed blower 14. When this blower 14 is operated, the air in the inner cylinder 12 flows into the circulating pipe 13 from the upper end thereof as shown by the arrows, and then into the lower portion of the inner cylinder 12 through the blower 14. This air then flows upwardly in the interior of the inner cylinder 12. The flow rate of this air can be varied by varying the rotational speed of the blower 14.

A humidifier 15 is connected to the lower end portion of the inner cylinder 12 through a discharge pipe 16 extending from the humidifier 15. This humidifier 15 is used to feed water vapor into the interior of the inner cylinder 12 and thereby generate a cloud in a manner as will be described later. An air suction pipe 17 extending into the humidifier 15 is joined to a side surface of the cooling tower 4 so as to suck cold air from the interior of the cooling tower 4. A bypass pipe 18 is branched from the air suction pipe 17. Air from outside the cooling tower 4 can be drawn into bypass pipe 17 to the humidifier 15 through pipe 18. The bypass pipe 17 is provided with a flow rate regulating valve 20 so that the flow rate of the outside air flowing into the bypass pipe 17 can be regulated.

A nozzle 21 is provided at a position slightly higher than the discharge port of the discharge pipe 16 extending from the humidifier 15. This nozzle 21 is supplied from an air compressor 23 through a pipe 22, which is provided at an intermediate portion thereof with a second air cooler 24 for cooling the compressed air from the air compressor 23.

Prior to the generation of snow, the first cooler 9 is operated to cool the air in the cooling tower 4. The blower 14 is operated at the same time to circulate the air in the interior of the inner cylinder 12. The air in the inner cylinder 12 is thus cooled indirectly by the first cooler 9. Thus cooling operation is continued until the temperature of the air in the inner cylinder 12 has reached, for example, about −15° C. and this temperature has become stable. The range of this temperature is generally −15° C.~−10° C.

When the temperature in the inner cylinder 12 has become stable, the rotational speed of the blower 14 is reduced to lower the flow rate of the air in the inner cylinder 12 to 5 cm/s, for example. The humidifier 15 is then operated to feed mist-like water vapor into the inner cylinder 12. During this time, the air drawn into the humidifier from the cooling tower consists of the cooling air in the cooling tower 4, and, therefore, the water vapor added in the humidifier has a low temperature of 0° C., for example. The temperature of the drawn in air can be regulated by regulating the rate of admission of the outside air through the regulating valve 20 in the bypass pipe 18 and mixing the outside air with the cooling air from the cooling tower 4. The water vapor sent into the inner cylinder 12 turns into a cloud which simulates the conditions of a natural cloud. This cloud moves upwardly in the inner cylinder 12 with the air flowing up due to the action of the blower 14, and it turns into an over-cooled cloud which is maintained in the upper portion of the interior of cylinder 12 and from which some air is removed by the blower 14 operating at the lower speed.

The air compressor 23 is then operated to send the compressed air at about 8 kg/cm², for example, into the inner cylinder 12 through the nozzle 21. This compressed air is cooled by the second cooler 24 before it reaches the nozzle 21. The heat in the cooled compressed air flowing out of the nozzle 21 is removed by the adiabatic expansion thereof, so that the compressed air is cooled to about −40° C. Because there is no overcooled cloud around the nozzle, the water contained in the compressed air turns into ice crystals rather than snow, which ice particles are carried upward with the air flowing upwardly in the inner cylinder 12. When the ice crystals contact the overcooled cloud maintained in the upper portion of the interior of the inner cylinder 12, a phenomenon similar to the natural phenomenon occurs, i.e., snow occurs in the cloud, and the hexapetalous crystalline structure grows and falls. When the rotational speed of the blower 14 is then increased to retain the thus formed snow in the upper portion of the interior of the inner cylinder 12 so that the snow does not fall, the particles grow further. When the particles have grown to a large enough weight, the grown snow falls continuously into the fallen snow collection chamber 1 through the opening 3.

During this time, the size, condition (wetness and dryness) and shape of the snow flakes can be varied by regulating the blower 14 and first and second coolers 9 and 24 so as to control the temperature in the interior of the inner cylinder 12, the temperature of the cloud, the temperature of the ice crystals and the velocity of flow of the upward air current in the inner cylinder 12.

The present invention is not, of course, limited to the above embodiment. It maybe modified in various ways within the scope of the appended claims.

We claim:

1. A snow generating and snowfall apparatus comprising:
    a fallen snow collection chamber having in a top wall thereof an opening;
    a vertically extending cooling tower having the bottom mounted on said top wall and surrounding said opening;
    a first air cooler connected to said tower for cooling the air in said tower;
    an inner cylinder positioned in said cooling tower and extending in the lengthwise direction thereof and having a bottom end opening connected to said opening in said top wall;
    a circulating passage connecting the top end of said inner cylinder and a lower end portion thereof to each other;
    a humidifier connected to the lower portion of said inner cylinder for feeding water vapor into said inner cylinder in the vicinity of the lower end thereof for forming a cloud in said inner cylinder which can rise to the top thereof while being overcooled;
    means connected to said inner cylinder in the vicinity of said humidifier for feeding a snow-generating material consisting of ice crystals into said inner cylinder; and
    a variable speed blower in an intermediate portion of said circulating passage for, during normal operation, removing only some of the cloud from the top end of said inner cylinder, while maintaining the supercooled cloud therein, and recirculating it to the lower end portion of said inner cylinder for thus causing it to carry the ice crystals upwardly into the overcooled cloud.

2. An apparatus as claimed in claim 1 in which said humidifier has an air suction pipe connected to the interior of said cooling tower, a bypass pipe connected to said air suction pipe and open to the space around said cooling tower for allowing air from outside the cooling tower to be drawn into said suction pipe, and a flow rate regulating valve in said bypass pipe.

3. An apparatus as claimed in claim 1 in which said means for feeding a snow-generating material comprises an air compressor, a compressed air pipe extending from a discharge port of said air compressor to the interior of said inner cylinder, a nozzle on the end of said compressed air pipe and opening into said inner cylinder, and a second air cooler in said compressed air pipe for cooling the compressed air.

4. A snow generating and snowfall apparatus comprising:
    a vertically extending cooling tower having the bottom end closed;
    a first air cooler connected to said tower for cooling the air in said tower;
    an inner cylinder positioned in said cooling tower and extending in the lengthwise direction thereof and having a bottom end opening out of said closed bottom end;
    a circulating passage connecting the top end of said inner cylinder and a lower end portion thereof to each other;
    a humidifier connected to the lower portion of said inner cylinder for feeding water vapor into said inner cylinder in the vicinity of the lower end thereof for forming a cloud in said inner cylinder which can rise to the top thereof while being overcooled;

means connected to said inner cylinder in the vicinity of said humidifier for feeding a snow-generating material consisting of ice crystals into said inner cylinder; and a variable speed blower in an intermediate portion of said circulating passage for, during normal operation, removing only some of the cloud from the top end of said inner cylinder, while maintaining the supercooled cloud therein, and recirculating it to the lower end portion of said inner cylinder for thus causing it to carry the ice crystals upwardly into the overcooled cloud.

* * * * *